United States Patent Office 2,805,939
Patented Sept. 10, 1957

2,805,939

METHOD OF TREATING IRON BEARING ORES

Felix A. Schaufelberger, Stamford, Conn., assignor to Chemical Construction Corporation, New York, N. Y., a corporation of Delaware No Drawing. Application August 16, 1954,
Serial No. 450,273

2 Claims. (Cl. 75—108)

This invention relates to a process for separating iron values from non-ferrous metal values. More particularly, this invention is directed to a process for treating iron-bearing, non-sulfide ores of varying grades to recover therefrom iron in a form suitable for further processing. Still more specifically, the invention is concerned with the total sulfuric acid leach of such ores.

As major potential sources of low grade iron ores, the various deposits of lateritic type ores, for example, those found in Cuba, have long been considered. Unfortunately, these ores contain many varied diluent minerals such as silica, alumina and mixed oxides of chromium and of nickel, cobalt, magnesium and manganese in amounts which render them unsuitable for preparing ordinary carbon steels. For example, in such ores, the amount of nickel and chromium may frequently exceed 0.25% and 0.5%, respectively. Before such deposits can be commercially developed a successful concentration of the iron is essential.

It is a principal object of the present invention to prepare from low grade iron ores, by the elimination of deleterious impurities, an iron-bearing product suitable as a feed for smelting, open hearth furnacing, iron powder and pigment manufacture.

It is another object to recover metal values other than iron, such as nickel and cobalt from a mixed sulfate solution, obtained when pure iron oxide is precipitated.

It is a still further object to utilize substantially all of a sulfuric acid leach solvent to minimize the overall cost of lateritic iron ore beneficiation.

Other objects will appear from the following description.

In general, the objects of the present invention are readily met by a straightforward expedient of directly precipitating basic ferric sulfate from a mixed sulfate solution containing dissolved iron and non-ferrous metals along with excess sulfuric acid by supplying heat to the mixed sulfate solution. The precipitated basic ferric sulfate may be further treated by roasting or calcining to obtain both a high grade iron oxide of good purity and sulfurous gases for reuse. Resultant sintered iron oxide has sufficient physical strength so that it can be charged to a blast furnace.

The present invention further contemplates the reuse of residual sulfate solution containing excess sulfuric acid as an additive to a leach liquor so as to minimize the cost of the leaching operation from which sulfate solution may originally be obtained.

A mixed sulfate solution is obtained by leaching an aqueous slurry of a lateritic iron ore in the presence of a substantially stoichiometric excess of aqueous sulfuric acid. During leaching, however, sufficient sulfric acid must be present so that the concentration of free sulfuric acid is in excess of about 1%. The resultant slurry is filtered or decanted to remove any acid-insoluble solids such as clay, quartz, chromite or the like. If the sulfate solution is then heated at an elevated temperature in a closed vessel, basic ferric sulfate precipitates out of the solution and can be collected by filtration and calcined or roasted to produce ferric oxide of high purity and good physical strength. The roasted precipitate (ferric oxide) is suitable for smelting or for other uses requiring iron oxide low in impurities.

The residual solution after filtration or decantation contains some ferric sulfate and the non-ferrous metal sulfates as well as substantial amounts of free sulfuric acid, the latter emanating from (a) the excess acid used in leaching and from (b) the ferric sulfate conversion to basic ferric sulfate. It is then recycled to the leaching operation as an adjunct to leaching until that solution becomes sufficiently enriched with non-ferrous values, so that the solution may be economically treated by any of the methods commonly employed in the art to recover such non-ferrous values as nickel and cobalt therefrom. In general, the number of cycles is determined by an appropriate analysis for the non-ferrous metal values. Usually, three to five cycles of the residual solution to the leaching step will sufficiently enrich that solution with these non-ferrous metal values. In a continuous operation, of course, the major part of the solution will be recycled to the leach and a smaller part bled off for treatment to recover the non-ferrous metal values.

A modification of the above recycling operation is to withdraw part of the leach liquor prior to precipitating basic ferric sulfate and add thereto fresh iron ore to completely utilize any excess sulfuric acid. The resultant mixture is filtered and the incompletely leached ore residue is returned to the initial leaching operation. The filtrate is then heated in accordance with the principles of my invention.

As noted above, basic ferric sulfate, whose approximate formula is, $Fe_2O_3 \cdot 2SO_3 \cdot H_2O$, will precipitate from a heated sulfate solution obtained from the leaching operation. The basic ferric sulfate is then calcined to obtain iron oxide. However, according to the present invention as an improved modification of this procedure, the sulfate solution is diluted with water prior to heating and thereby during heating convert dissolved ferric sulfate, usually containing 15–17% S, directly to insoluble ferric oxide containing less than 1% S. The amount of water required in this operation is usually three to four volumes, based upon the ferric and sulfate ion content of the solution. Specifically, water is added to bring the concentration of sulfate ion to less than about 75 g./l. A good operating range has been found to be from between 20–60 g./l. Thus, ferric sulfate may be directly converted to precipitated iron oxide with the elimination of a roasting operation. All the sulfate associated with the iron before it is precipitated then becomes available as free sulfuric acid for further leaching.

Any suitable closed reaction vessel or autoclave may be employed to carry out the sulfate solution heating operation. The contents in the vessel may be subjected to temperatures and superatmospheric pressures over a comparatively wide range, which are above about 150° C. and 70 pounds per square inch, respectively. In general, the higher the temperature, the more complete is the precipitation of ferric iron in the form of its sulfate. This is borne out by the fact that at about two moles of sulfate ion per liter, the ferric ion solubility at 200° C. is about 3 g./l. At 230° C., the corresponding ferric ion solubility is about 1 g./l. In contrast to ferric sulfate, however, ferrous sulfate does not obey the foregoing solubility data. For example, the solubility of ferrous sulfate at 200° C. is considerably higher, about 50 g. $Fe^{++}$/l. A good operating temperature range is from about 150° C. to 230° C. and a good pressure range is from about 70 to 400 p. s. i. g. These pressures and temperatures are entirely satisfactory to effect precipitation of the basic ferric sulfate from solution.

The iron oxide obtained in accordance with the above-described procedure is of sufficiently high purity and grade so as to make it entirely useable as an open hearth or blast furnace charge. The refined iron oxide product contains a high iron content of from about 65–70%; less than 0.1% nickel, cobalt, manganese and sulfur; and less than 0.2% magnesium, chromium and silica; and less than 2% alumina.

Although the process of the invention has been described with reference to the recovery of a satisfactory iron oxide product, attendant benefits obviously are obtained from the process through the separation and recovery of valuable non-ferrous metal values such as nickel, cobalt and chromium.

While the present process has been described with reference to lateritic type iron ores, any iron-bearing, non-sulfide, oxidized ore may be used. Also any iron-bearing ore which is substantially oxidized during leaching may be used.

The invention will be further illustrated by the following example without being limited thereto.

One liter of a leach solution analyzing (g./l.): 62-Fe; 2.1-Ni+Co; 7.2-Al+Mg+Mn and 24-free $H_2SO_4$ is diluted with water to four liters. Upon heating to 230° C., dark red iron oxide precipitated instead of basic ferric sulfate. The latter iron oxide analyzed as containing 0.8% S as contrasted to 15–17% S found in basic ferric sulfate. After filtration, the filtrate analyzed (g./l.): 4.2-Fe and 17-$H_2SO_4$; 0.55-Ni+Co; 7.2-Al+Mg+Mn. To insure a proper water balance, this filtrate is concentrated to the original volume prior to dilution in which form it is recycled to a leaching operation.

I claim:

1. In treating an oxidized, non-sulfide ore, containing ferrous and non-ferrous minerals by leaching an aqueous slurry of said ore in the presence of an excess of sulfuric acid over the stoichiometric requirements, separating resultant leach liquor from residual solids, and subjecting separated liquor to heat and pressure to precipitate iron-bearing solids; the improvement which comprises, diluting the separated liquor with sufficient water to produce a sulfate ion concentration of less than about 75 grams per liter, heating said diluted liquor in a closed vessel to a temperature above about 150° C. and to a pressure above atmospheric pressure, whereby a major portion of the dissolved iron is caused to precipitate as ferric oxide substantially free from sulfate radicals and collecting resultant precipitate.

2. A process of separating ferrous metal values from an aqueous sulfuric acid solution containing dissolved sulfates of ferrous and non-ferrous metal values, which includes the steps of: diluting said solution with water to a residual sulfate ion concentration of from about 20 to about 75 grams per liter, heating resultant diluted solution to a temperature of from about 150° C. to about 230° C., and to a pressure above atmospheric pressure, whereby dissolved iron is caused to precipitate as substantially sulfate-free ferric oxide, and separating precipitated ferric oxide from the so-treated solution of non-ferrous metal values.

References Cited in the file of this patent

UNITED STATES PATENTS

| | | |
|---|---|---|
| 981,451 | McKechnie | Jan. 10, 1911 |
| 1,503,229 | Clark | July 29, 1924 |